(12) United States Patent
Zhang et al.

(10) Patent No.: US 11,531,529 B2
(45) Date of Patent: Dec. 20, 2022

(54) METHOD AND ELECTRONIC DEVICE FOR DEPLOYING OPERATOR IN DEEP LEARNING FRAMEWORK

(71) Applicant: BEIJING BAIDU NETCOM SCIENCE TECHNOLOGY CO., LTD., Beijing (CN)

(72) Inventors: Liujie Zhang, Beijing (CN); Xiang Lan, Beijing (CN); Huihuang Zheng, Beijing (CN); Hongyu Liu, Beijing (CN); Wei Zhou, Beijing (CN); Yanjun Ma, Beijing (CN); Dianhai Yu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/500,779

(22) Filed: Oct. 13, 2021

(65) Prior Publication Data

US 2022/0035614 A1    Feb. 3, 2022

(30) Foreign Application Priority Data

Mar. 24, 2021    (CN) .......................... 202110315269.9

(51) Int. Cl.
*G06F 8/61* (2018.01)
*G06F 8/41* (2018.01)
(Continued)

(52) U.S. Cl.
CPC .................. *G06F 8/61* (2013.01); *G06F 8/41* (2013.01); *G06F 9/44521* (2013.01); *G06N 3/10* (2013.01)

(58) Field of Classification Search
CPC .......... G06F 8/61; G06F 8/41; G06F 9/44521; G06N 3/10
(Continued)

(56) References Cited

U.S. PATENT DOCUMENTS 7,860,823 B2 * 12/2010 Hejlsberg ............ G06F 16/2438
707/603
9,703,550 B1 * 7/2017 McCann ............ G06F 9/44505
(Continued)

FOREIGN PATENT DOCUMENTS

| CN | 103019944 A | 4/2013 |
| CN | 105072461 A | 11/2015 |

(Continued)

OTHER PUBLICATIONS

Title: USP: A lightweight file system management framework, author Z Shi et al, published on 2010.*
(Continued)

*Primary Examiner* — Chameli Das
(74) *Attorney, Agent, or Firm* — Maschoff Brennan

(57) ABSTRACT

The present disclosure discloses a method, an apparatus and an electronic device for deploying an operator in a deep learning framework and relates to the field of artificial intelligence technology such as deep learning. And the solution is: acquiring a source file of the operator; compiling the source file of the operator to form a dynamic link library of the operator; generating an interface file transferred from the dynamic link library of the operator; generating an installable library file according to the dynamic link library and the interface file; installing the installable library file to a target programming language library.

18 Claims, 7 Drawing Sheets

(51) Int. Cl.
  *G06F 9/445* (2018.01)
  *G06N 3/10* (2006.01)
(58) Field of Classification Search
  USPC .......................................................... 717/174
  See application file for complete search history.

(56) References Cited

U.S. PATENT DOCUMENTS

| | | | | |
|---|---|---|---|---|
| 10,114,624 | B1* | 10/2018 | Makkar | ..................... G06F 8/37 |
| 2016/0092183 | A1 | 3/2016 | Radigan | |
| 2019/0026159 | A1* | 1/2019 | Haderbache | .......... G06F 12/023 |
| 2019/0369975 | A1* | 12/2019 | Maor | .................. G06F 11/3624 |
| 2021/0081837 | A1* | 3/2021 | Polleri | ....................... G06F 8/41 |
| 2021/0191696 | A1* | 6/2021 | Ibarra Von Borstel | ... G06F 8/41 |
| 2022/0051093 | A1* | 2/2022 | Skaljak | ................... G06N 3/088 |
| 2022/0092439 | A1* | 3/2022 | Liu | ........................... G06N 5/04 |
| 2022/0114429 | A1* | 4/2022 | Chen | ...................... G06N 3/063 |

FOREIGN PATENT DOCUMENTS

| | | |
|---|---|---|
| CN | 106126282 A | 11/2016 |
| CN | 106502745 A | 3/2017 |
| CN | 106598680 A | 4/2017 |
| CN | 107038045 A | 8/2017 |
| CN | 108875959 A | 11/2018 |
| CN | 110673837 A | 1/2020 |
| CN | 110908837 A | 3/2020 |
| CN | 110989995 A | 4/2020 |
| CN | 111176626 A | 5/2020 |
| CN | 111290778 A | 6/2020 |
| CN | 111782334 A | 10/2020 |
| CN | 112507102 A | 3/2021 |

OTHER PUBLICATIONS

Title: Oops for motion planning: An online, open-source, programming system, author: E Plaku, et al, published on 2007.*
Title: Countering code-injection attacks with instruction-set randomization, author: GS Kc, published on 2003.*
Title: Reflective DLL injection, author: S Fewer, published on 2008.*
First OA for CN application 202110315269.9 dated Jan. 28, 2022.
Yanjun et al., "PaddlePaddle: An Open-Source Deep Learning Platform from Industrial Practice" vol. 1 No. 1 Oct. 2019, ISSN 2096-742X, Epic, Persistent Identifiers for Research.
Second OA for CN application 202110315269.9 dated Apr. 7, 2022.
Search Report for EP application 21201447.6 dated Mar. 25, 2022.
Pradelle et al., "Polyhedral Optimization of Tensor Flow Computation Graphs" Springer Nature Switzerland AG 2019, LNCS 11027, pp. 74-89, Apr. 26, 2019.
Westra, E., "Using Modules and Packages" Modular programming with python. Packt Publishing, Limited. Retrieved on Mar. 16, 2022.
"Enviroment setup for Importing a userdefined module" Retrieved on Mar. 16, 2022, Retrieved From: https://askubuntu.com/questions/442357/enviornment-setup-for-importing-a-userdefined-module.

* cited by examiner

METHOD AND ELECTRONIC DEVICE FOR DEPLOYING OPERATOR IN DEEP LEARNING FRAMEWORK

CROSS-REFERENCE TO RELATED APPLICATION

This application claims priority to Chinese Patent Application No. 202110315269.9, filed on Mar. 24, 2021, the entire contents of which are incorporated herein by reference.

TECHNICAL FIELD

Embodiments of the present disclosure generally relate to the field of data processing technology, and more specifically to the field of artificial intelligence technology such as deep learning.

BACKGROUND

The current mainstream deep learning frameworks contain a wealth of tensor calculation and processing units, which are collectively referred to as operators. A wealth of operator libraries may provide a powerful basic tool for quickly building deep learning models, but the operator libraries in the deep learning frameworks are generally unable to achieve completeness, especially in the field of frontier academic research, there are often situations where a current operator library cannot satisfy specific logical computing operations. Therefore, the respective major deep learning frameworks provide users with a mechanism for customizing operators.

The customization of the operators is mainly implemented by the C++ Language (The C++ Programming Language/c plus plus), and it needs to be compiled with the source code separately, linked into a dynamic library, and then loaded and imported on the front end for use. This not only requires users to have a certain understanding of this framework, but also often requires users to have the basic knowledge of C++ source code compilation. If it involves implementation of operators that support GPU (Graphics Processing Unit) devices, users need to understand the background knowledge of CUDA (Compute Unified Device Architecture) compilation. As a result, it will inevitably lead to technical problems of extremely high cost for user use, extremely strong dependence on other third-party libraries (such as library pybind11), lack of flexibility and low efficiency. Therefore, how to improve efficiency, flexibility and decoupling in the deployment process of operators in the deep learning frameworks and reduce cost for user use has become one of the important research directions.

SUMMARY

The present disclosure provides a method, an apparatus and an electronic device for deploying an operator in a deep learning framework.

According to a first aspect, a deployment method for an operator in a deep learning framework is provided, which includes:
  acquiring a source file of the operator;
  compiling the source file of the operator to form a dynamic link library of the operator;
  generating an interface file transferred from the dynamic link library of the operator;
  generating an installable library file according to the dynamic link library and the interface file; and
  installing the installable library file to a target programming language library.

According to a second aspect, an electronic device is provided, which includes: at least one processor; and a memory communicatively connected with the at least one processor; wherein instructions executable by the at least one processor are stored in the memory, and the instructions are executed by the at least one processor, so that the at least one processor can execute the deployment method for the operator in the deep learning framework according to the first aspect of the present disclosure.

According to a third aspect, a non-transitory computer-readable storage medium is provided, in which computer instructions are stored, the computer instructions being configured to cause the computer execute the deployment method for the operator in the deep learning framework according to the first aspect of the present disclosure.

It should be understood that the content described in the present section is not intended to identify the key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the present solution, and do not constitute a limitation to the present disclosure, in which.

DETAILED DESCRIPTION

Figure 1:
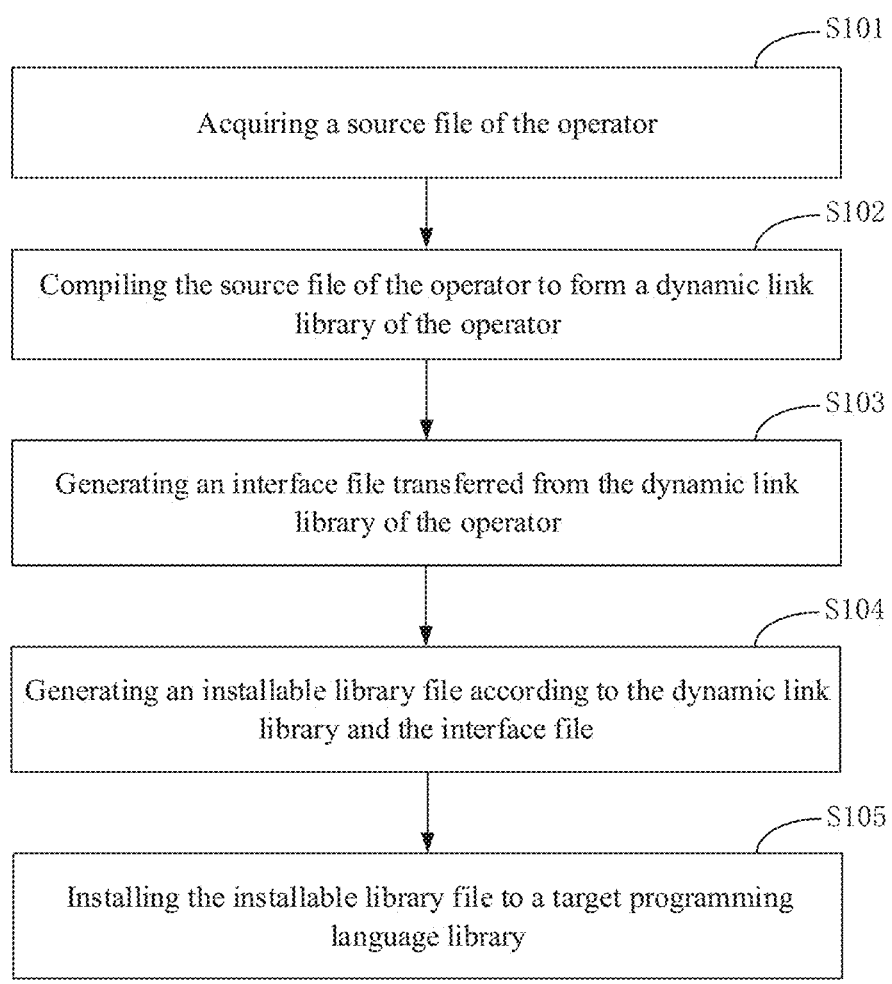
FIG. 1 is a schematic diagram of a first embodiment according to the present disclosure.

The following describes exemplary embodiments of the present disclosure with reference to the accompanying drawings, which include various details of the embodiments of the present disclosure to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

The technical fields involved in the solution of the present disclosure will be briefly described in the following:

Data Processing, including processing of collection, storage, retrieval, processing, changing and transmission and the like of data, is intended to extract and deduce valuable and meaningful data for certain users from a large amount of possibly disorderly and incomprehensible data.

AI (Artificial Intelligence) is a discipline that studies how to cause computers to simulate certain thinking processes and intelligent behaviors (such as learning, reasoning, thinking, planning, etc.) of human being, which includes not only technologies of hardware level, but also technologies of software level. Artificial intelligence hardware technologies generally include several major aspects of computer vision technology, speech recognition technology, natural language processing technology and its learning/deep learning, big data processing technology, knowledge map technology and the like.

DL (Deep Learning) is a new research direction in the field of ML machine learning (Machine Learning), and is introduced into machine learning to bring it closer to the original goal—artificial intelligence. Deep learning is to learn internal laws and representation levels of sample data, and the information obtained in these learning processes is of great help to interpretation of data such as text, images, sounds and the like. Its ultimate goal is to enable machines to have abilities to analyze and learn like humans, and to recognize data such as text, images, sounds and the like. Deep learning is a complex machine learning algorithm that has achieved effects in speech and image recognition far surpassing previous related technologies.

It should be noted that in related technologies, implementations of compiling and installing of deep learning frameworks that support custom operator function are different, which mainly include the following two approaches: an approach based on setup.py (write file) and an approach of front-end load interface based on JIT (Just-In-Time compilation).

Wherein for the approach based on setup.py, by exemplifying the Pytorch framework, the setuptools library of the front-end language python is used therein to support users to execute the install command to compile and generate a custom operator library, and install it into the python library, to support user import and use.

However, in this case, the custom operator needs to rely on the Pybind11 module, the user must install it in advance, and the custom operator needs to be explicitly bound with Pybind11, otherwise it cannot be exposed to the front-end for use.

Wherein in the approach based on the JIT front-end load interface, the bottom layer of the interface relies on third-party tools such as CMake and Ninja, which require users to configure in advance.

Therefore, the present disclosure proposes a deployment method for an operator in a deep learning framework, which can no longer rely on Pybind11 and other third-party modules, and highly encapsulates setuptools and completely conceals all processes of compilation, linking and installation, so that users do not need to know any conceptual knowledge of the underlying framework link library, compilation options, etc., which is relied on. Furthermore, the principle of code injection can be used to support flexible customization of generation approaches of python library installation files, which greatly reduces learning cost of users, and at the same time improves efficiency, flexibility and reliability of the deployment process of the operator in the deep learning framework.

A method, an apparatus and an electronic device for deploying an operator in a deep learning framework of embodiments of the present disclosure will be described with reference to the accompanying drawings in the following.

FIG. 1 is a schematic diagram of a first embodiment according to the present disclosure. Wherein it should be noted that the execution subject of the method for deploying an operator in a deep learning framework of the present embodiment is the apparatus for deploying an operator in a deep learning framework, and the apparatus for deploying an operator in a deep learning framework may specifically be a hardware device or a software in the hardware device and the like. Wherein the hardware device may be a terminal device, a server and the like. As shown in FIG. 1, the method for deploying an operator in a deep learning framework proposed in the present embodiment includes the following steps:

S101 of acquiring a source file of the operator.

It should be noted that the current mainstream deep learning frameworks contain a wealth of tensor calculation and processing units, which are collectively referred to as operators, such as the convolution Conv2D operator in the field of vision, and the LSTM (Long Short-Term Memory, long and short-term memory artificial neural network) operator in the field of natural language processing and the basic function activation ReLU (Rectified Linear Unit, linear rectification function) operator, etc.

Wherein the source files of the operators may be the CPP/C++ language (The C++ Programming Language/c plus plus) or CUDA (Compute Unified Device Architecture) source code files corresponding to the custom operator (OP for short) to be compiled by the user.

It should be noted that a CPP file generally ends with .cc or .cpp; if a GPU (Graphics Processing Unit) device is to be supported, a CUDA source code file ending with .cu will be needed.

S102 of compiling the source file of the operator to form a dynamic link library of the operator.

It should be noted that a deep learning framework generally needs to involve a front-end system (Python) and a back-end system (C++). What is written by a custom operator of a user is back-end C++ code. In this case, in order to be able to be called by the front-end Python, it needs to be compiled into a file of a specific format so as to be loaded into the memory in the Python front-end system and to be called by an operator calculation logic function (e.g., such as convolution Cony) implemented by the C++ back-end system.

For example, after a local native compilation command (i.e. the source file of the operator) of user, such as the gcc/g++/nvcc command under Linux (the full name of which is GNU/Linux) system, is called, the dynamic link library of the operator can be compiled and generated.

In the embodiment of the present disclosure, the processing object is the C++ or CUDA source code file. Through pre-processing, compilation, assembling and linking, the compilation of the source file of the operator can be implemented, so that the dynamic link library of the operator is formed.

S103 of generating an interface file transferred from the dynamic link library of the operator.

It should be noted that in related technologies, all the deep learning frameworks include front-end systems and back-end systems. Wherein the back-end systems are mostly implemented in C++ language, which contain many specific logical operations of operators. For example, the actual data computational operation of the convolution operation Conv is implemented in C++. In this case, the advantages lie in high computational efficiency and good execution performance; and the front-end systems are mostly implemented in Python language, which realize the calling of the back-end operator Kernel through a simply encapsulated API (Application Programming Interface) interface. In this case, the advantages lie in low implementation cost and good user experience.

In the embodiment of the present disclosure, the API interface of the front-end system can be automatically generated only according to the operation-related code in C++ language and corresponding to the custom operator, which is written by the user for the back-end system, that is, the interface file transferred from the dynamic link library of the operator can be automatically generated.

S104 of generating an installable library file according to the dynamic link library and the interface file.

Wherein the installable library file may be a file with a file suffix of .egg. The file with the file suffix of .egg is a file format used by the Python programming language to manage third-party installable libraries.

In the embodiment of the present disclosure, the dynamic link library and the interface file are packaged in accordance with a preset packaging strategy to generate the installable library file.

S105 of installing the installable library file to a target programming language library.

It should be noted that after the installable library file is installed into the target programming language library, the installation of the custom operator of the user into the target programming language library can be realized to support subsequent calling by users.

In the embodiment of the present disclosure, the installable library file may be installed under the target directory in the target programming language library.

According to the deployment method for an operator in a deep learning framework of the embodiment of the present disclosure, a source file of the operator can be acquired, the source file of the operator will be compiled to form a dynamic link library of the operator, and an interface file transferred from the dynamic link library of the operator will be generated, and then an installable library file will be generated according to the dynamic link library and the interface file, and then the installable library file will be installed to a target programming language library, so as to realize the deployment for an operator in a deep learning framework, which no longer relies on third-party modules, which can completely hide all the processes of the installation of an operator, which greatly reduces learning cost of users and at the same time improves efficiency, flexibility and reliability of the deployment process of the operator in the deep learning framework.

It should be noted that in the present disclosure, when trying to compile the source file of the operator to form the dynamic link library of the operator, the source file of the operator can be compiled through preprocessing, compilation, assembling and linking. .

Figure 2:
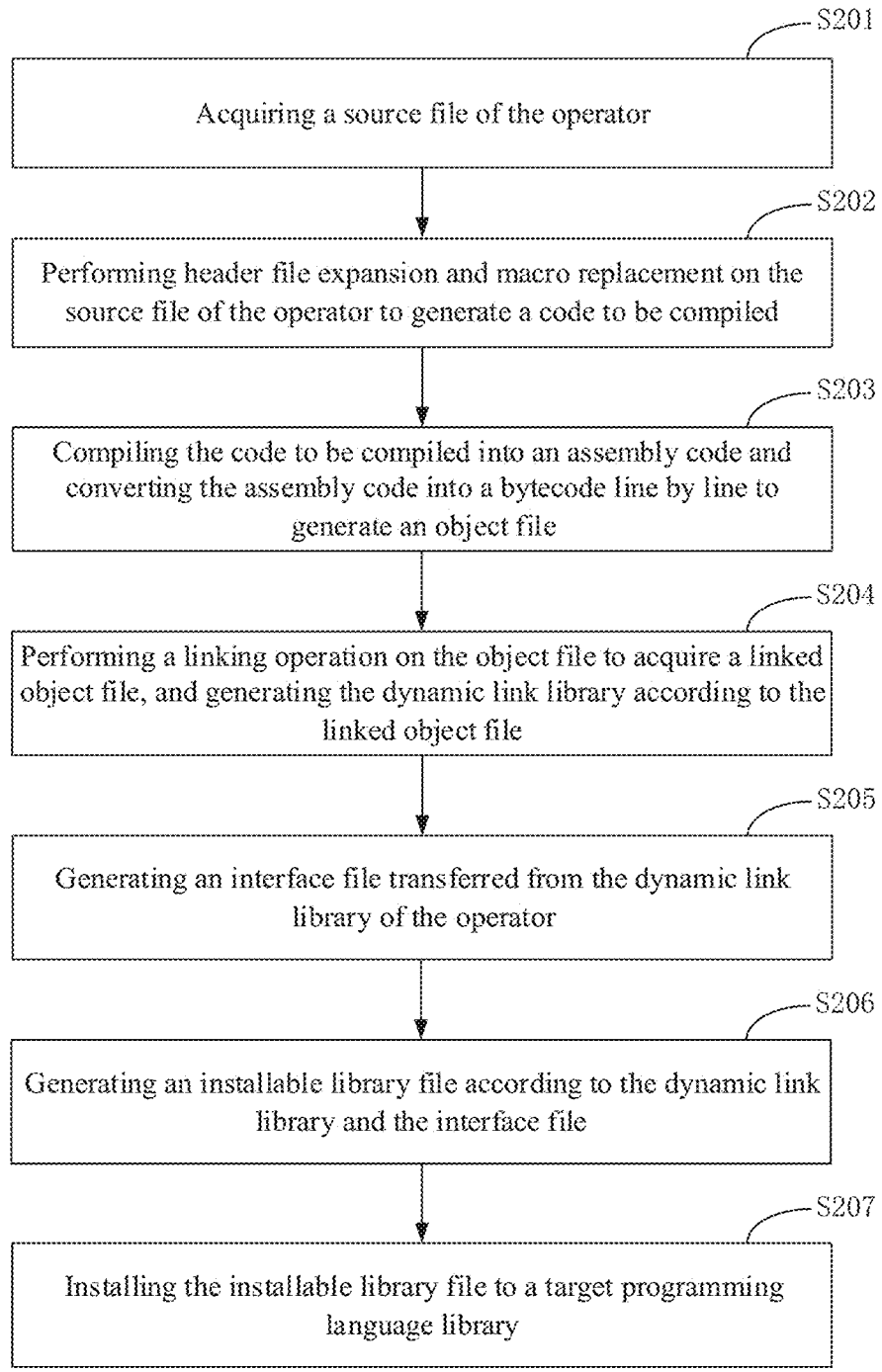
FIG. 2 is a schematic diagram of a second embodiment according to the present disclosure.

FIG. 2 is a schematic diagram of a second embodiment according to the present disclosure. As shown in FIG. 2, on the basis of the previous embodiment, the deployment method of an operator in a deep learning framework proposed in the present embodiment includes the following steps:

S201 of acquiring a source file of the operator.

This step S201 is the same as the step S101 in the previous embodiment, and will not be repeated here.

The step S102 in the previous embodiment may specifically include the following steps S202 to S204.

The S202 of performing header file expansion and macro replacement on the source file of the operator to generate a code to be compiled.

In the embodiment of the present disclosure, the code to be compiled may be generated through preprocessing operation.

Alternatively, header file expansion and macro replacement may be performed through a preprocessor on code lines beginning with "#" in the source file, to generate the code to be compiled.

Wherein it is allowed to substitute parameters into text, and this kind of implementation is usually referred to as macro definition or macro replacement, or macro for short.

The S203 of compiling the code to be compiled into an assembly code and converting the assembly code into a bytecode line by line to generate an object file.

In the embodiment of the present disclosure, the code to be compiled, which is generated after preprocessing, may be compiled and assembled to generate an object file (Object File). Wherein the object file may be an executable file or a library file (such as a static library or a dynamic library).

Alternatively, for the compilation phase, the code to be compiled may be compiled into the underlying assembly code.

Further, for the assembling stage, the assembly code may be converted line by line into a bytecode (i.e., a machine code) through the assembler to generate the object file.

The S204 of performing a linking operation on the object file to acquire a linked object file, and generating the dynamic link library according to the linked object file.

In the embodiment of the present disclosure, the dynamic link library may be generated by linking the object files.

Alternatively, the object files generated by the foregoing process may be collectively linked together to generate an executable file or a library file (such as a static library or a dynamic library).

It should be noted that at this stage, all references to undefined identifiers will be replaced with corresponding correct addresses.

S205 of generating an interface file transferred from the dynamic link library of the operator.

This step S205 is the same as the step S103 in the previous embodiment, and will not be repeated here.

S206 of generating an installable library file according to the dynamic link library and the interface file.

Alternatively, the dynamic link library and the interface file may be packaged in accordance with a preset packaging strategy to generate the installable library file.

For example, the dynamic link library file and a Python API file may be packaged into a python library file that can be installed on the front end. Alternatively, a built-in library of the Python language, such as setuptools, may be used, and packaging may be realized through steps of install, build, extracting and the like. Wherein the foregoing steps are composed of several processing functions.

S207 of installing the installable library file to a target programming language library.

This step S207 is the same as the step S105 in the previous embodiment, and will not be repeated here.

According to the deployment method of the operator in the deep learning framework of the embodiment of the application, the source file of the operator can be compiled through preprocessing, compilation, assembling and linking, so that all operations are completely hidden from users, which greatly reduces learning and usage costs of users and improves ease of use. Furthermore, it is no longer dependent on any third-party compilation tools and modules, and has stronger decoupling.

It should be noted that in the present disclosure, when trying to install the installable library file to the target programming language library, the installable library file may be installed under the target directory in the target programming language library.

By exemplifying a site-package, the installable library file in a format with a file suffix of .egg is of the standard installation protocol file format of python and may be used to install into the site-package.

Wherein the Python language includes many packaged third-party libraries, and each library contains many APIs that are available for calling. All these third-party libraries are placed under a site-package directory under the Python installation path. In other words, the site-package directory is a "repository" containing many third-party libraries, which can be used to manage all installed libraries of Python.

Furthermore, after the installable library file is installed into the target programming language library, the custom operator of the user can be imported for use.

Figure 3:
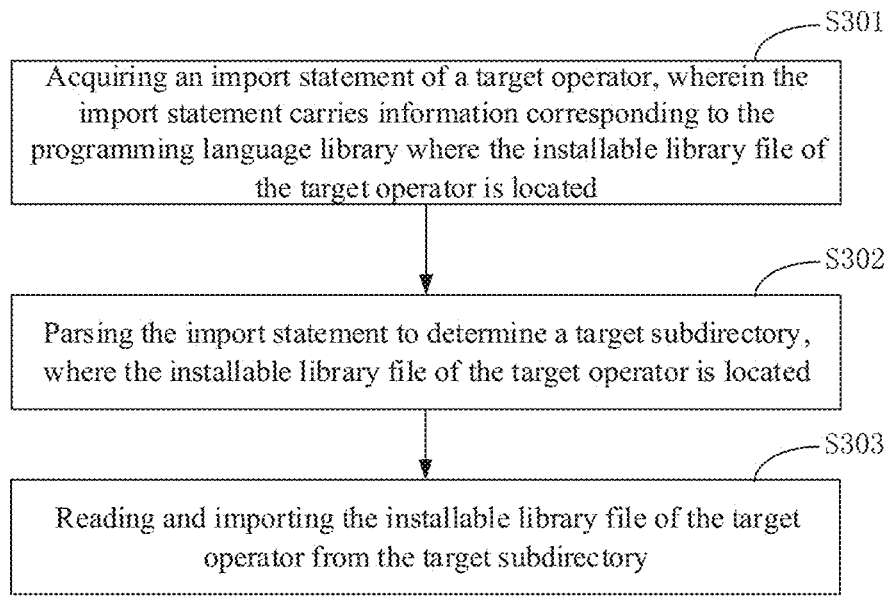
FIG. 3 is a schematic diagram of a third embodiment according to the present disclosure.

FIG. 3 is a schematic diagram of a third embodiment according to the present disclosure. As shown in FIG. 3, on the basis of the previous embodiment, the deployment method of an operator in a deep learning framework proposed in the present embodiment includes the following steps:

S301 of acquiring an import statement of the target operator, wherein the import statement carries information corresponding to the programming language library where the installable library file of the target operator is located.

It should be noted that the import of python is realized through the keyword "import". For example, if A is a pre-installed third-party library, the following import statement written by the user can be acquired: import A.

In the embodiment of the present disclosure, after the installable library file is installed in the target programming language library, the custom operator of the user can be imported and used through the import statement written by the user.

S302 of parsing the import statement to determine a target subdirectory, where the installable library file of the target operator is located.

For example, the import statement import A is parsed. In this case, it can be determined that the target subdirectory, where the installable library file of the target operator is located, is the subdirectory site-package/A under the site-package directory.

S303 of reading and importing the installable library file of the target operator from the target subdirectory.

Alternatively, when the import is executed for importing, the relevant installable library file of the target operator may be read from the target subdirectory and imported in for subsequent use.

It should be noted that in the present disclosure, a subdirectory similar to A can be automatically generated by installing the installable library file.

For example, if A.egg is installed, the A.egg can be automatically decompressed and copied into the corresponding subdirectory, that is, the subdirectory of site-package/A.

According to the deployment method for the operator in the deep learning framework of the embodiment of the present disclosure, an import statement of the target operator may be acquired, and the import statement may be parsed to determine a target subdirectory where the installable library file of the target operator is located, and then and the installable library file of the target operator may be read from the target subdirectory and imported, which is more consistent and easier to use.

Further, in the present disclosure, the interface file related to the framework can be injected into the entry file by way of code injection to customize loading process of the dynamic link library and calling method of the interface file.

Figure 4:
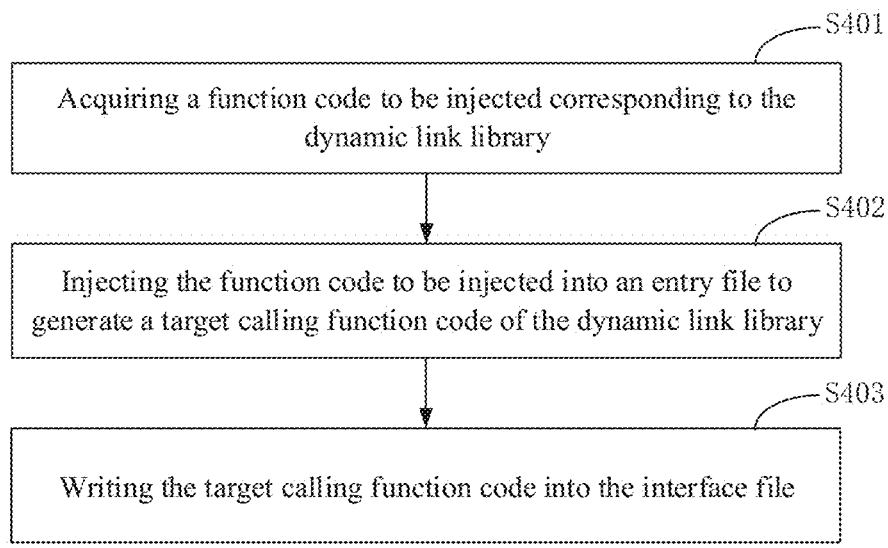
FIG. 4 is a schematic diagram of a fourth embodiment according to the present disclosure.

FIG. 4 is a schematic diagram of a fourth embodiment according to the present disclosure. As shown in FIG. 4, on the basis of the previous embodiment, the deployment method of an operator in a deep learning framework proposed in the present embodiment includes the following steps:

S401 of acquiring a function code to be injected corresponding to the dynamic link library.

Wherein the function code to be injected may be any function code input by a user.

S402 of injecting the function code to be injected into an entry file to generate a target calling function code of the dynamic link library.

Figure 5:
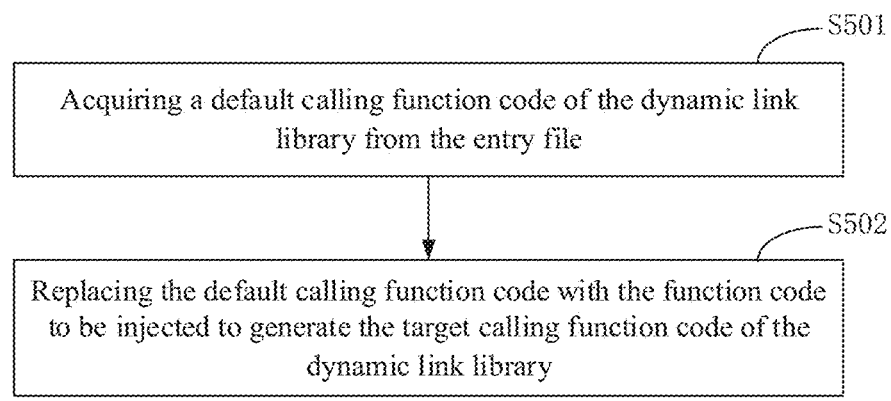
FIG. 5 is a schematic diagram of a fifth embodiment according to the present disclosure.

As a possible implementation, as shown in FIG. 5, on the basis of the previous embodiment, the injecting the function code to be injected into the entry file to generate the target calling function code of the dynamic link library in the above step S402 includes the following steps:

S501 of acquiring a default calling function code of the dynamic link library from the entry file.

Figure 6:
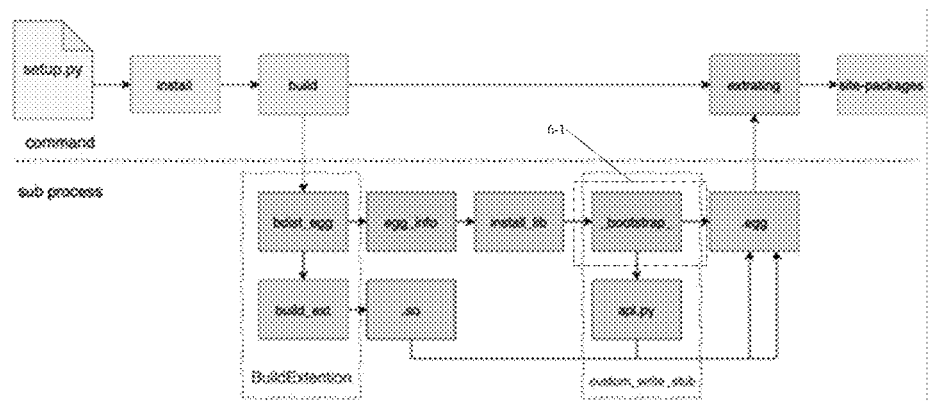
FIG. 6 is a schematic diagram according to a flow of a Python package release.

As shown in FIG. 6, by exemplifying the default calling function 6-1 as _bootstrap_, _bootstrap_ is the default calling function for loading the dynamic link library when the python front-end imports the custom operator library, which is the logic built in the default calling function Python.

It should be noted that the default calling function code may be placed in an api.py. For example, for conv.py, when the user executes the import cony statement, the _bootstrap_ function of conv.py will be called.

S502 of replacing the default calling function code with the function code to be injected to generate the target calling function code of the dynamic link library.

In the embodiment of the present disclosure, the default calling function that is built in Python may be dynamically replaced, and its function code may be modified to the function code that the user tries to inject according to actual requirements.

For example, the _bootstrap_ function that is built in Python may be dynamically replaced, and its function code may be modified to the function code to be injected.

S403 of writing the target calling function code into the interface file.

For example, the modified _bootstrap_ function code may be written into a specific interface api.py, such as conv.py, to implement a complete code injection process.

According to the deployment method for the operator in the deep learning framework of the embodiment of the present disclosure, a function code to be injected corresponding to the dynamic link library may be acquired, and the function code to be injected may be injected into an entry file to generate a target calling function code of the dynamic link library, and then the target calling function code is written into the interface file, so that the interface file related to the framework can be injected into the entry file by way of code injection to customize loading process of the dynamic link library and calling method of the interface file.

By way of code injection, the way of the native dynamic library loading and API calling is replaced, and a novel technical idea for realizing the generation function of a customized python installable library in combination with the deep learning framework is provided.

Corresponding to the deployment method for the operator in the deep learning framework provided by the foregoing several embodiments, an embodiment of the present disclosure further provides a deployment apparatus for an operator in a deep learning framework. Because the deployment apparatus for the operator in the deep learning framework provided by the embodiment of the present disclosure corresponds to the deployment method for the operator in the deep learning framework provided by the foregoing several embodiments, the embodiments of the deployment method for the operator in the deep learning framework are also applicable to the deployment apparatus for the operator in the deep learning framework provided by the embodiment of the present disclosure, which will not be described in detail in the present embodiment.

Figure 7:
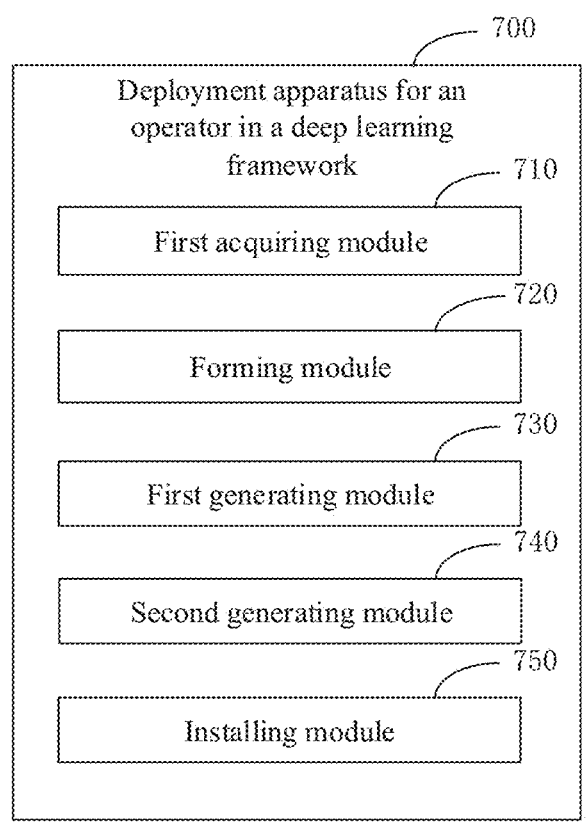
FIG. 7 is a block diagram of a deployment apparatus for an operator in a deep learning framework used to implement a deployment method for an operator in a deep learning framework of an embodiment of the present disclosure.

FIG. 7 is a schematic structural diagram of a deployment apparatus for an operator in a deep learning framework according to an embodiment of the present disclosure.

As shown in FIG. 7, the deployment apparatus 700 for an operator in a deep learning framework includes a first acquiring module 710, a forming module 720, a first generating module 730, a second generating module 740 and an installing module 750. Wherein:

the first acquiring module 710 is configured for acquiring a source file of the operator;

the forming module 720 is configured for compiling the source file of the operator to form a dynamic link library of the operator;

the first generating module 730 is configured for generating an interface file transferred from the dynamic link library of the operator;

the second generating module 740 is configured for generating an installable library file according to the dynamic link library and the interface file;

the installing module 750 is configured for installing the installable library file to a target programming language library.

Figure 8:
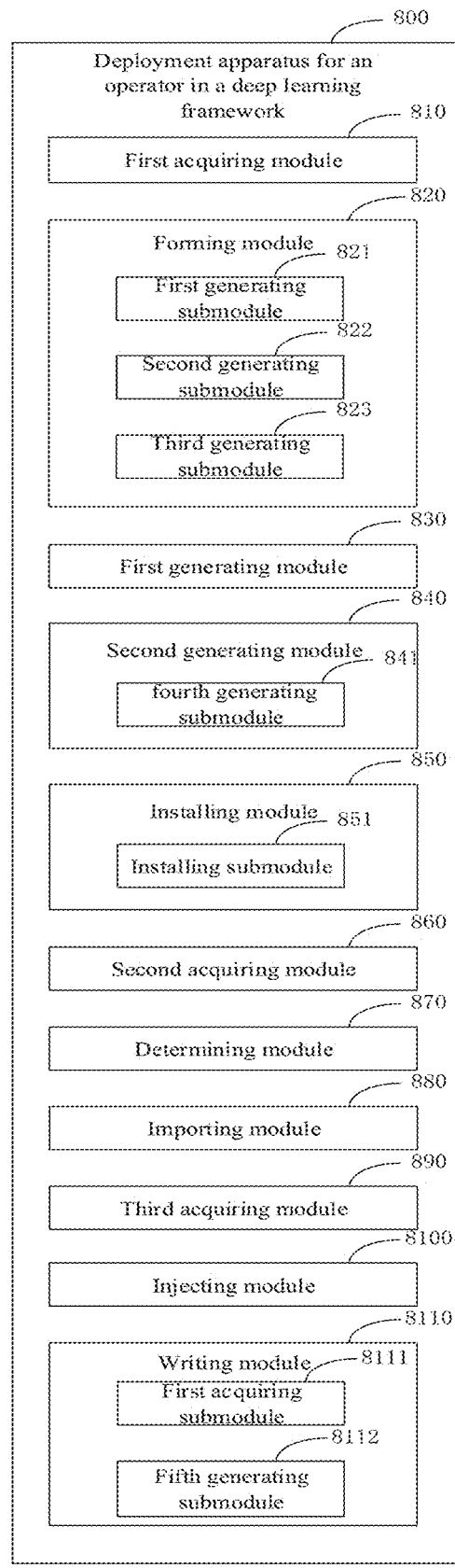
FIG. 8 is a block diagram of a deployment apparatus for an operator in a deep learning framework used to implement a deployment method for an operator in a deep learning framework of an embodiment of the present disclosure.

FIG. 8 is a schematic structural diagram of a deployment apparatus for an operator in a deep learning framework according to another embodiment of the present disclosure.

As shown in FIG. 8, the deployment apparatus 800 for an operator in a deep learning framework includes a first acquiring module 810, a forming module 820, a first generating module 830, a second generating module 840 and an installing module 850. Wherein:

The forming module 820 includes:

a first generating submodule 821, which is configured for performing header file expansion and macro replacement on the source file of the operator to generate a code to be compiled;

a second generating submodule 822, which is configured for compiling the code to be compiled into an assembly code and converting the assembly code into a bytecode line by line to generate an object file;

a third generating submodule 823, which is configured for performing a linking operation on the object file to acquire a linked object file, and for generating the dynamic link library according to the linked object file.

Wherein the second generating module 840 includes:

a fourth generating submodule 841, which is configured for packaging the dynamic link library and the interface file in accordance with a preset packaging strategy to generate the installable library file.

Wherein the installing module 850 includes:

an installing submodule 851, which is configured for installing the installable library file to a target directory in the target programming language library.

Wherein the deployment apparatus 800 for an operator in a deep learning framework further includes:

a second acquiring module 860, which is configured for acquiring an import statement of the target operator, wherein the import statement carries information corresponding to the programming language library where the installable library file of the target operator is located;

a determining module 870, which is configured for parsing the import statement to determine a target subdirectory where the installable library file of the target operator is located;

an importing module 880, which is configured for reading and importing the installable library file of the target operator from the target subdirectory;

a third acquiring module 890, which is configured for acquiring a function code to be injected corresponding to the dynamic link library;

an injecting module 8100, which is configured for injecting the function code to be injected into an entry file to generate a target calling function code of the dynamic link library;

a writing module 8110, which is configured for writing the target calling function code into the interface file.

Wherein the writing module 8110 includes:

a first acquiring submodule 8111, which is configured for acquiring a default calling function code of the dynamic link library from the entry file;

a fifth generating submodule 8112, which is configured for replacing the default calling function code with the function code to be injected to generate the target calling function code of the dynamic link library.

According to the deployment apparatus for an operator in a deep learning framework of the embodiment of the present disclosure, a source file of the operator can be acquired, the source file of the operator will be compiled to form a dynamic link library of the operator, and an interface file transferred from the dynamic link library of the operator will be generated, and then an installable library file will be generated according to the dynamic link library and the interface file, and then the installable library file will be installed to a target programming language library, so as to realize the deployment for an operator in a deep learning framework, which no longer relies on third-party modules, which can completely hide all the processes of the installation of an operator, which greatly reduces learning cost of users and at the same time improves efficiency, flexibility and reliability of the deployment process of the operator in the deep learning framework.

According to embodiments of the present disclosure, the present disclosure also provides an electronic device, a readable storage medium, and a computer program product.

Figure 9:
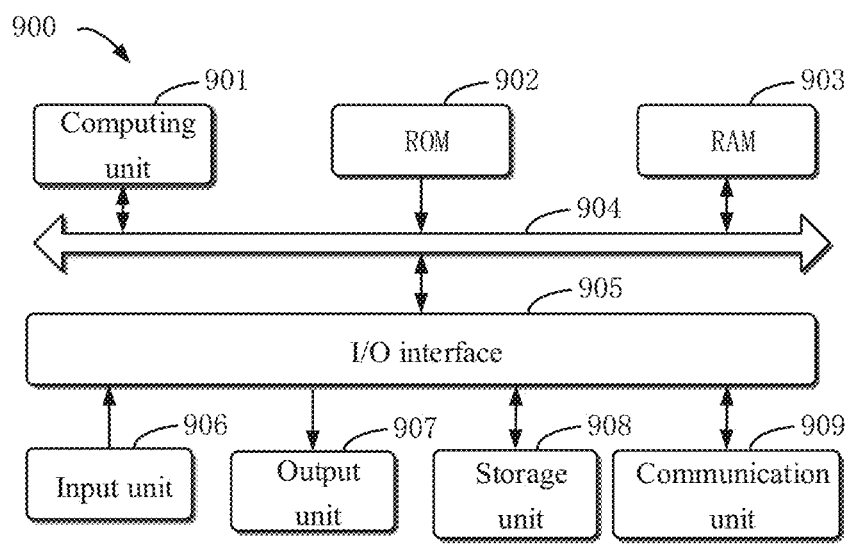
FIG. 9 is a block diagram of an electronic device used to implement a deployment method for an operator in a deep learning framework of an embodiment of the present disclosure.

FIG. 9 shows a schematic block diagram of an example electronic device 900 that can be used to implement embodiments of the present disclosure. An electronic device is intended to represent various forms of digital computers, such as a laptop computer, a desktop computer, a workstation, a personal digital assistant, a server, a blade server, a mainframe computer and other suitable computers. An electronic device can also represent various forms of mobile apparatuses, such as personal digital processing, cellular phone, smart phone, a wearable device and other similar computing apparatuses. The components shown herein, their connections and relationships and their functions are merely examples, and are not intended to limit the implementation of the present disclosure described and/or required herein.

As shown in FIG. 9, the device 900 includes a computing unit 901, which can perform various suitable actions and processing according to a computer program stored in a read-only memory (ROM) 902 or a computer program loaded from a storage unit 908 to a random access memory (RAM) 903. In the RAM 903, various programs and data required for operations of the device 900 may also be stored. The computing unit 901, the ROM 902 and the RAM 903 are connected to each other through a bus 904. An input/output (I/O) interface 905 is also connected to the bus 904.

Multiple components in the device 900 are connected to the I/O interface 905, including: an input unit 906, such as a keyboard, a mouse, etc.; an output unit 907, such as various types of displays, speakers, etc.; and the storage unit 908, such as a disk, an optical disc, etc.; and a communication unit 909, such as a network card, a modem, a wireless communication transceiver, etc. The communication unit 909 allows the device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processing (DSP), and any suitable processor, controller, microcontroller, etc. The computing unit 901 executes the various methods and processes described above, such as the deployment method for the operator in the deep learning framework. For example, in some embodiments, the deployment method for the operator in the deep learning framework may be implemented as a computer software program, which is tangibly contained in a machine-readable medium, such as the storage unit 908. In some embodiments, part or all of the computer program may be loaded and/or installed onto the device 900 via the ROM 902 and/or the communication unit 909. When the computer program is loaded into the RAM 903 and executed by the computing unit 901, one or more steps of the method for training the deep learning framework described above can be executed. Alternatively, in other embodiments, the computing unit 901 may be configured to perform the deployment method for the operator in the deep learning framework in any other suitable manner (for example, by means of firmware).

The above various embodiments of the systems and technologies described herein can be implemented in a digital electronic circuit system, an integrated circuit system, a field programmable gate array (FPGA), an application specific integrated circuit (ASIC), an application-specific standard product (ASSP), a system of a system on chip (SOC), a load programmable logic device (CPLD), a computer hardware, firmware, software, and/or a combination thereof. These various embodiments may include: being implemented in one or more computer programs, which may be executed and/or interpreted on a programmable system including at least one programmable processor, the programmable processor may be a dedicated or general-purpose programmable processor that can receive data and instructions from a storage system, at least one input device and at least one output device, and transmit data and instructions to the storage system, the at least one input device and the at least one output device.

The program codes used to implement the method of the present disclosure can be written in any combination of one or more programming languages. These program codes can be provided to a processor or controller of a general-purpose computer, a special-purpose computer or other programmable character image restoration devices, so that when the program codes are executed by the processor or controller, the functions/operations specified in the flowcharts and/or block diagrams are implemented. The program codes can be executed entirely on a machine, partly executed on a machine, partly executed on a machine and partly executed on a remote machine as an independent software package, or entirely executed on a remote machine or a server.

In the context of the present disclosure, a machine-readable medium may be a tangible medium, which may contain or store a program for use by an instruction execution system, an apparatus or a device or for use in combination with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared or semiconductor system, an apparatus or a device or any suitable combination of the foregoing. More specific examples of the machine-readable storage medium may include electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combination of the foregoing.

In order to provide interaction with a user, the systems and technologies described here can be implemented on a computer, which has: a display apparatus for displaying information to the user (for example, a CRT (cathode ray tube) or LCD (liquid crystal display) monitor); and a keyboard and pointing apparatus (for example, a mouse or a trackball), through which the user can provide input to the computer. Other types of apparatuses can also be used to provide interaction with the user; for example, the feedback provided to the user can be any form of sensory feedback (for example, visual feedback, auditory feedback or tactile feedback); and input from the user can be received in any form (including acoustic input, voice input or tactile input).

The systems and technologies described here can be implemented in a computing system that includes back-end components (for example, as a data server), or a computing system that includes middleware components (for example, an application server), or a computing system that includes front-end components (for example, a user computer with a graphical user interface or a web browser, through which the user can interact with the embodiments of the systems and technologies described herein), or a computing system that includes any combination of such background components, middleware Components or front-end components. The components of the system can be connected to each other through any form or medium of digital data communication (for example, a communication network). Examples of the communication network include: a local area network (LAN), a wide area network (WAN), the Internet, and a blockchain network.

The computer system may include a client and a server. The client and the server are generally far away from each other and usually interact through a communication network. The relationship between the client and the server will be generated by a computer program that runs on a corresponding computer and has a client-server relationship with each other. A service side may be a cloud server, also known as a cloud computing server or a cloud host, which is a host product in a cloud computing service system to solve the defect of the existed shortcomings of difficult management and weak business scalability in the traditional physical host and VPS service ("Virtual Private Server", or "VPS" for short). The server may also be a server of a distributed system, or a server combined with a blockchain.

It should be understood that the various forms of flows shown above can be used to reorder, add or delete steps. For example, the respective steps described in the present disclosure may be executed in parallel, or also may be executed sequentially, or also may be executed in a different order, as long as the desired result of the technical solution disclosed in the present disclosure can be achieved, and will be not limited herein.

The foregoing specific embodiments do not constitute limitation on the protection scope of the present disclosure. Those skilled in the art should understand that various modifications, combinations, sub-combinations and substitutions can be made according to design requirements and other factors. Any modification, equivalent replacement and improvement and the like made within the spirit and principle of the present disclosure shall be included in the protection scope of the present disclosure.

What is claimed is:

1. A deployment method for an operator in a deep learning framework, comprising:
    acquiring a source file of the operator;
    compiling the source file of the operator to form a dynamic link library of the operator;
    generating an application programming interface file of a front-end system of the deep learning framework transferred from the dynamic link library of the operator;
    generating an installable library file according to the dynamic link library and the application programming interface file;
    installing the installable library file to a target programming language library;
    acquiring a function code to be injected corresponding to the dynamic link library;
    injecting the function code to be injected into an entry file to generate a target calling function code of the dynamic link library, the entry file including a default calling function code of the dynamic link library; and
    writing the target calling function code into the application programming interface file.

2. The deployment method according to claim 1, wherein the compiling the source file of the operator to form the dynamic link library of the operator comprises:
    performing header file expansion and macro replacement on the source file of the operator to generate a code to be compiled;
    compiling the code to be compiled into an assembly code and converting the assembly code into a bytecode line by line to generate an object file; and
    performing a linking operation on the object file to acquire a linked object file, and generating the dynamic link library according to the linked object file.

3. The deployment method according to claim 1, wherein the generating the installable library file according to the dynamic link library and the application programming interface file comprises:
    packaging the dynamic link library and the application programming interface file in accordance with a preset packaging strategy to generate the installable library file.

4. The deployment method according to claim 1, wherein the installing the installable library file to the target programming language library comprises:
    installing the installable library file to a target directory in the target programming language library.

5. The deployment method according to claim 1, further comprising:
    acquiring an import statement of a target operator, wherein the import statement carries information corresponding to a programming language library where an installable library file of the target operator is located;
    parsing the import statement to determine a target subdirectory where the installable library file of the target operator is located; and
    reading and importing the installable library file of the target operator from the target subdirectory.

6. The deployment method according to claim 1, wherein the injecting the function code to be injected into the entry file to generate the target calling function code of the dynamic link library comprises:
    acquiring a default calling function code of the dynamic link library from the entry file; and
    replacing the default calling function code with the function code to be injected to generate the target calling function code of the dynamic link library.

7. An electronic device, comprising:
    a processor; and
    a memory for storing a program corresponding to an executable program code,
    wherein the processor is configured to read the executable program code stored in the memory, to perform actions of:
    acquiring a source file of an operator;
    compiling the source file of the operator to form a dynamic link library of the operator;
    generating an application programming interface file of a front-end system of a deep learning framework transferred from the dynamic link library of the operator;
    generating an installable library file according to the dynamic link library and the application programming interface file;
    installing the installable library file to a target programming language library;
    acquiring a function code to be injected corresponding to the dynamic link library;
    injecting the function code to be injected into an entry file to generate a target calling function code of the dynamic link library, the entry file including a default calling function code of the dynamic link library; and
    writing the target calling function code into the application programming interface file.

8. The electronic device according to claim 7, wherein the compiling the source file of the operator to form the dynamic link library of the operator comprises:
    performing header file expansion and macro replacement on the source file of the operator to generate a code to be compiled;

compiling the code to be compiled into an assembly code and converting the assembly code into a bytecode line by line to generate an object file; and performing a linking operation on the object file to acquire a linked object file, and generating the dynamic link library according to the linked object file.

9. The electronic device according to claim 7, wherein the generating the installable library file according to the dynamic link library and the application programming interface file comprises:

packaging the dynamic link library and the application programming interface file in accordance with a preset packaging strategy to generate the installable library file.

10. The electronic device according to claim 7, wherein the installing the installable library file to the target programming language library comprises:

installing the installable library file to a target directory in the target programming language library.

11. The electronic device according to claim 7, wherein the processor is further configured to read the executable program code stored in the memory, to perform actions of:

acquiring an import statement of a target operator, wherein the import statement carries information corresponding to a programming language library where an installable library file of the target operator is located;

parsing the import statement to determine a target subdirectory where the installable library file of the target operator is located; and reading and importing the installable library file of the target operator from the target subdirectory.

12. The electronic device according to claim 7, wherein the injecting the function code to be injected into the entry file to generate the target calling function code of the dynamic link library comprises:

acquiring a default calling function code of the dynamic link library from the entry file; and replacing the default calling function code with the function code to be injected to generate the target calling function code of the dynamic link library.

13. A non-transitory computer-readable storage medium, on which a computer program is stored, wherein the program is configured to perform a deployment method for an operator in a deep learning framework, the method comprising:

acquiring a source file of the operator;

compiling the source file of the operator to form a dynamic link library of the operator;

generating an application programming interface file of a front-end system of the deep learning framework transferred from the dynamic link library of the operator;

generating an installable library file according to the dynamic link library and the application programming interface file;

installing the installable library file to a target programming language library;

acquiring a function code to be injected corresponding to the dynamic link library;

injecting the function code to be injected into an entry file to generate a target calling function code of the dynamic link library, the entry file including a default calling function code of the dynamic link library; and writing the target calling function code into the application programming interface file.

14. The non-transitory computer-readable storage medium according to claim 13, wherein the compiling the source file of the operator to form the dynamic link library of the operator comprises:

performing header file expansion and macro replacement on the source file of the operator to generate a code to be compiled;

compiling the code to be compiled into an assembly code and converting the assembly code into a bytecode line by line to generate an object file; and performing a linking operation on the object file to acquire a linked object file, and generating the dynamic link library according to the linked object file.

15. The non-transitory computer-readable storage medium according to claim 13, wherein the generating the installable library file according to the dynamic link library and the application programming interface file comprises:

packaging the dynamic link library and the application programming interface file in accordance with a preset packaging strategy to generate the installable library file.

16. The non-transitory computer-readable storage medium according to claim 13, wherein the installing the installable library file to the target programming language library comprises:

installing the installable library file to a target directory in the target programming language library.

17. The non-transitory computer-readable storage medium according to claim 13, wherein the method further comprises:

acquiring an import statement of a target operator, wherein the import statement carries information corresponding to a programming language library where an installable library file of the target operator is located;

parsing the import statement to determine a target subdirectory where the installable library file of the target operator is located; and reading and importing the installable library file of the target operator from the target subdirectory.

18. The non-transitory computer-readable storage medium according to claim 13, wherein the injecting the function code to be injected into the entry file to generate the target calling function code of the dynamic link library comprises:

acquiring a default calling function code of the dynamic link library from the entry file; and replacing the default calling function code with the function code to be injected to generate the target calling function code of the dynamic link library.

* * * * *